G. COMI.
TURF EDGE TRIMMER.
APPLICATION FILED APR. 20, 1917.

1,237,752. Patented Aug. 21, 1917.

Inventor
Girolamo Comi
by Seymour Earle
Attys

UNITED STATES PATENT OFFICE.

GIROLAMO COMI, OF COBALT, CONNECTICUT, ASSIGNOR OF ONE-HALF TO SAMUEL STEWART, OF COBALT, CONNECTICUT.

TURF-EDGE TRIMMER.

1,237,752.

Specification of Letters Patent.

Patented Aug. 21, 1917.

Application filed April 20, 1917. Serial No. 163,380.

*To all whom it may concern:*

Be it known that I, GIROLAMO COMI, a citizen of the United States, residing at Cobalt, in the county of Middlesex and State of Connecticut, have invented a new and useful Improvement in Turf-Edge Trimmers; and I do hereby declare the following, when taken in connection with the accompanying drawings and the characters of reference marked thereon, to be a full, clear, and exact description of the same, and which said drawings constitute part of this application, and represent, in—

Figure 1:
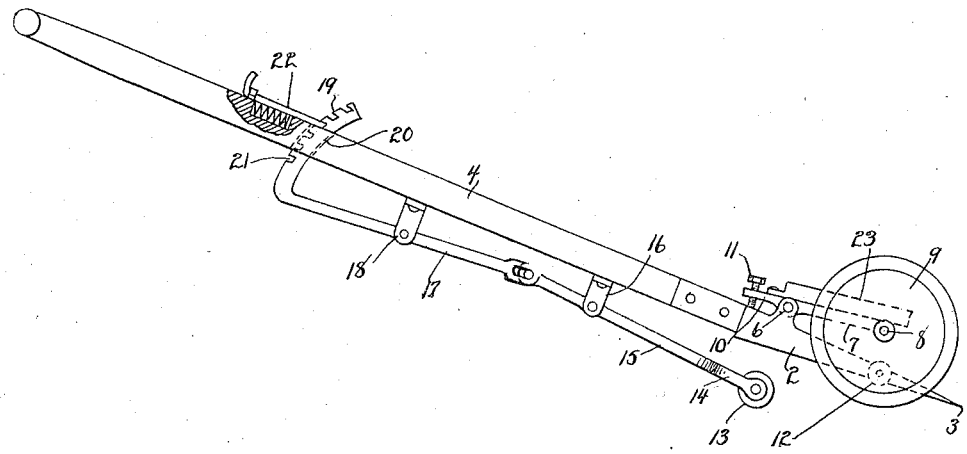

Figure 1 a side view partly in section of a turf-edge trimmer constructed in accordance with my invention.

Figure 2:
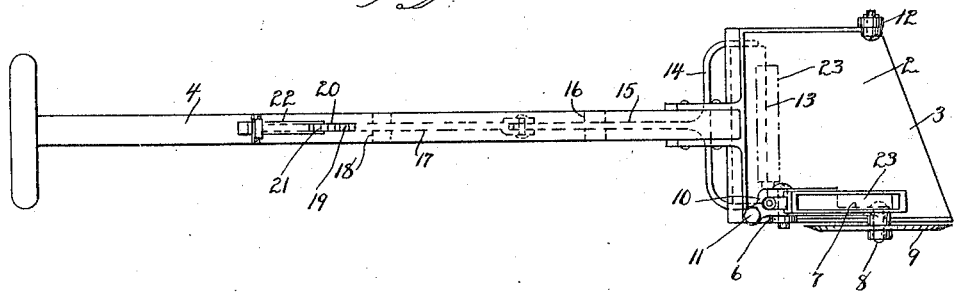

Fig. 2 a top or plan view of the same.

This invention relates to an improvement in turf-edge trimmers, and particularly for trimming the edges of lawns which are bordered by walks, the object being to provide a turf edge cutter and shovel which may be conveniently operated and conveniently moved from one place to another without injuring the cutter, and the invention consists in certain details of construction as will be hereinafter described and particularly recited in the claims.

In carrying out my invention, I employ a shovel pan 2 formed with a forwardly beveled edge 3 and attached to the end of a handle 4. At the right hand side of the pan is an upwardly projecting lug 6 to which an arm 7 is pivoted. At the forward end of the arm is an outwardly projecting stud 8 on which a disk-cutter 9 is mounted. The rear end 10 of the lever projects rearward of the lug 6 and in it is mounted a set screw 11 by which the outer end of the lever may be adjusted so as to raise or lower the cutter-disk 9 with relation to the outer edge of the shovel pan. Preferably and as herein shown, a small roller 12 will be secured to the left hand side of the shovel pan near its forward edge. Transversely arranged below the rear end of the pan 4 is a supporting-roller 13 which is mounted in a yoke 14 formed at the outer end of a roller lever 15 which is pivotally mounted in a lug 16 projecting downward from the lower face of the handle 5. This lever 15 projects beyond the lug 16 and is pivotally connected with one end of a lever 17 which is also pivoted to a lug 18 depending from the underside of the handle the forward end of this lever 17 being formed with a segmental end 19 which extends upward through a clearance opening 20 formed for it in the handle and is provided with notches 21 to be engaged by a spring latch 22 so as to lock the lever in its various positions of adjustment. By moving this lever 17 the roller 13 is raised or lowered to adjust the inclination of the pan and also to provide means for moving the device from one place to another with the cutter and edge of the shovel pan raised above the ground.

To provide for suitable weight at the cutter side of the shovel, I mount a box 23 on the top of the lever, which box may be filled with any weighty material. When the cutter is in use the box extends lengthwise of the lever 7 so as to bear upon the right hand side of the device to impose pressure upon the cutter. When moving the device from one place to another and when it is riding on the roller 13, this weight-box is swung around at right angles to the lever 7 as indicated in broken lines in Fig. 2 so as to equalize the weight of the device.

I claim:—

1. A turf edge trimmer comprising a shovel pan and handle, a longitudinally arranged lever pivotally mounted at one side of the pan, a disk-cutter at one side of the outer end of said lever, and means for raising and lowering the said outer end of the lever.

2. A turf edge trimmer comprising a shovel pan and handle, a lever pivotally mounted at one side of the shovel, a disk-cutter mounted at the outer end of said lever, and a weight pivotally mounted on the top of said lever and adapted to extend lengthwise thereof and be turned at right angles thereto.

3. A turf edge trimmer comprising a shovel pan and handle, a disk-cutter mounted at one side of the shovel pan, a pair of levers mounted on the underside of said handle, the ends of said levers pivotally connected together, a roller mounted in the outer end of the lower lever, the other lever formed with a segmental notched end, and means for interlocking the said end with the handle.

4. A turf edge trimmer comprising a shovel pan and handle, said handle formed with a clearance slot and provided at its underside with downwardly projecting lugs, two levers respectively mounted in said lugs, said levers pivotally connected together, one of said levers formed with a segmental notched end adapted to extend through the slot in the handle, a spring latch adapted to engage with the notches in the segmental end of the said lever, and the other lever provided at its outer end with a yoke, a roller mounted in said yoke, and a disk-cutter mounted at one side of the shovel pan.

In testimony whereof, I have signed this specification in the presence of two subscribing witnesses.

GIROLAMO COMI.

Witnesses:
EMMA E. BAILEY,
A. S. BAILEY.